United States Patent [19]
Ishida

[11] Patent Number: 5,937,085
[45] Date of Patent: Aug. 10, 1999

[54] IMAGE PROCESSING APPARATUS

[75] Inventor: Hideo Ishida, Tokyo, Japan

[73] Assignee: NEC Corporation, Tokyo, Japan

[21] Appl. No.: 08/713,787

[22] Filed: Sep. 13, 1996

[30] Foreign Application Priority Data

Sep. 18, 1995 [JP] Japan .................................... 7-238010

[51] Int. Cl.$^6$ .................................................. G06K 9/00
[52] U.S. Cl. .......................................... 382/162; 382/300
[58] Field of Search ...................................... 382/162, 166,
382/300; 348/426, 450, 455, 489, 491

[56] References Cited

U.S. PATENT DOCUMENTS 4,672,424  6/1987  Lechner ...................................... 348/491

*Primary Examiner*—Leo H. Boudreau
*Assistant Examiner*—Phuoc Tran

*Attorney, Agent, or Firm*—Scully, Scott Murphy and Presser

[57] ABSTRACT

An image processing apparatus includes a color difference data interpolator for alternately calculating the interpolation data items of color difference signals Cb and Cr in a time-sharing process. The interpolator includes registers for storing therein data items sb and sr of input color difference data items ICb and ICr, selectors for selecting either one of the data items ICb, sb, ICr, and sr and respectively outputting data items t1 and t2, an internal ratio calculating section for receiving the data items t1 and t2 to conduct an operation of (3×t1+t2) and outputting internal ratio data D, and registers for storing color difference Cb data B supplied from the data D. Consequently, an image processing circuit for the interpolation to enlarge the picture size of video data in the compressed YCbCr data format is reduced in the hardware size.

4 Claims, 5 Drawing Sheets

FIG. 1

△ : PIXEL POSITION p(h,i) BEFORE INTERPOLATION

O : RELATIVE POSITION c(j,k) OF COLOR DIFFERENCE DATA BEFORE INTERPOLATION

IMAGE PROCESSING APPARATUS

BACKGROUND OF THE INVENTION

The present invention relates to an image processing apparatus, and in particular, to an image processing apparatus having an image size enlarging function for video data including color television video signals.

Description of the Prior Art

In addition to the RGB data format for video data of this kind in which one pixel includes element data items of red (R), green (G), and blue (B) respectively corresponding to three primary colors, there has been known an YCbCr data format using three elements, namely, luminance data (Y) and two color difference data items (Cb and Cr). In the YCbCr data format, Y indicates brightness and Cb and Cr stand for the kind and clearness of color. Like in the RGB data format, one pixel includes three element data items Y, Cb, and Cr in the YCbCr data format.

In addition, there has been known a 4:2:2 YCbCr format (to be referred to as a compressed YCbCr format) in which data items are thinned out or skipped such that one Cb data item and one Cr data item correspond to Y data of four pixels including two horizontal pixels by two vertical pixels (to be abbreviated as 2×2 herebelow), thereby representing the video data with the luminance and color difference data items. In this format, the color difference data is thinned out to obtain one fourth of the original data according to the visual characteristic of the human senses. When processing pictures of the video data in this format, the YCbCr data format is preferably employed because of the reduced amount of data.

Figure 1:
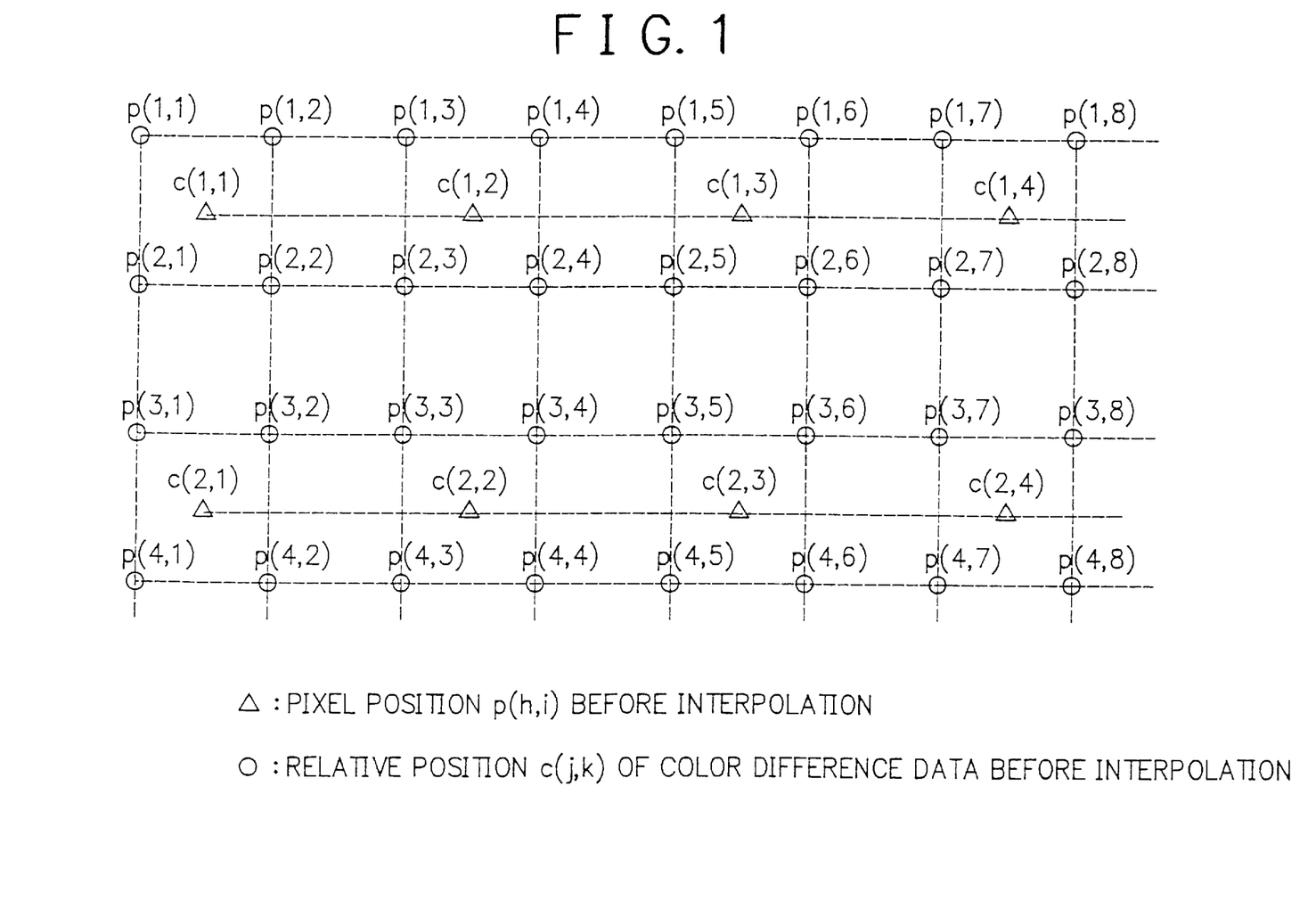
FIG. 1 is an explanatory diagram for explaining the relative positional relationship between pixel positions and color difference data items.

FIG. 1 shows the relative positional relationship between the pixel positions and color differences of the data in the compressed YCbCr data format. For example, pixel positions p(1,1), p(1,2), p(2,1), and p(2,2) correspond to color difference data c(1,1) and pixel positions p(1,3), p(1,4), p(2,3), and p(2,4) are associated with color difference data c(1,2). In this connection, the data position of luminance Y is identical to pixel position p(i,j).

In a case in which the 352×240 video data of the compressed YCbCr format is enlarged to be displayed on a screen complying with the present standard of the National Television System Committee (NTSC), there is required a process to double the number of horizontal pixels in association with the enlargement of picture size. However, in a method in which the same pixel is simply twice used for this purpose, although the picture size is doubled, since the color difference data has been thinned out, there arises discontinuity in the data and hence, for example, the color shading results. To overcome this disadvantage, it is necessary to adopt an interpolation process in the image magnifying operation so as to appropriately retain the data continuity. That is, for luminance data Y, a mean value is calculated for the adjacent data items to achieve the interpolation for the pertinent pixel; whereas, for the color difference data items, there are calculated a degree of influence according to an internal ratio between the color difference data of the adjacent data items and the relative pixel position after interpolation. Interpolation data is then generated according to the calculated degree of influence to keep the data continuity, thereby preventing the color shading.

Figure 2:
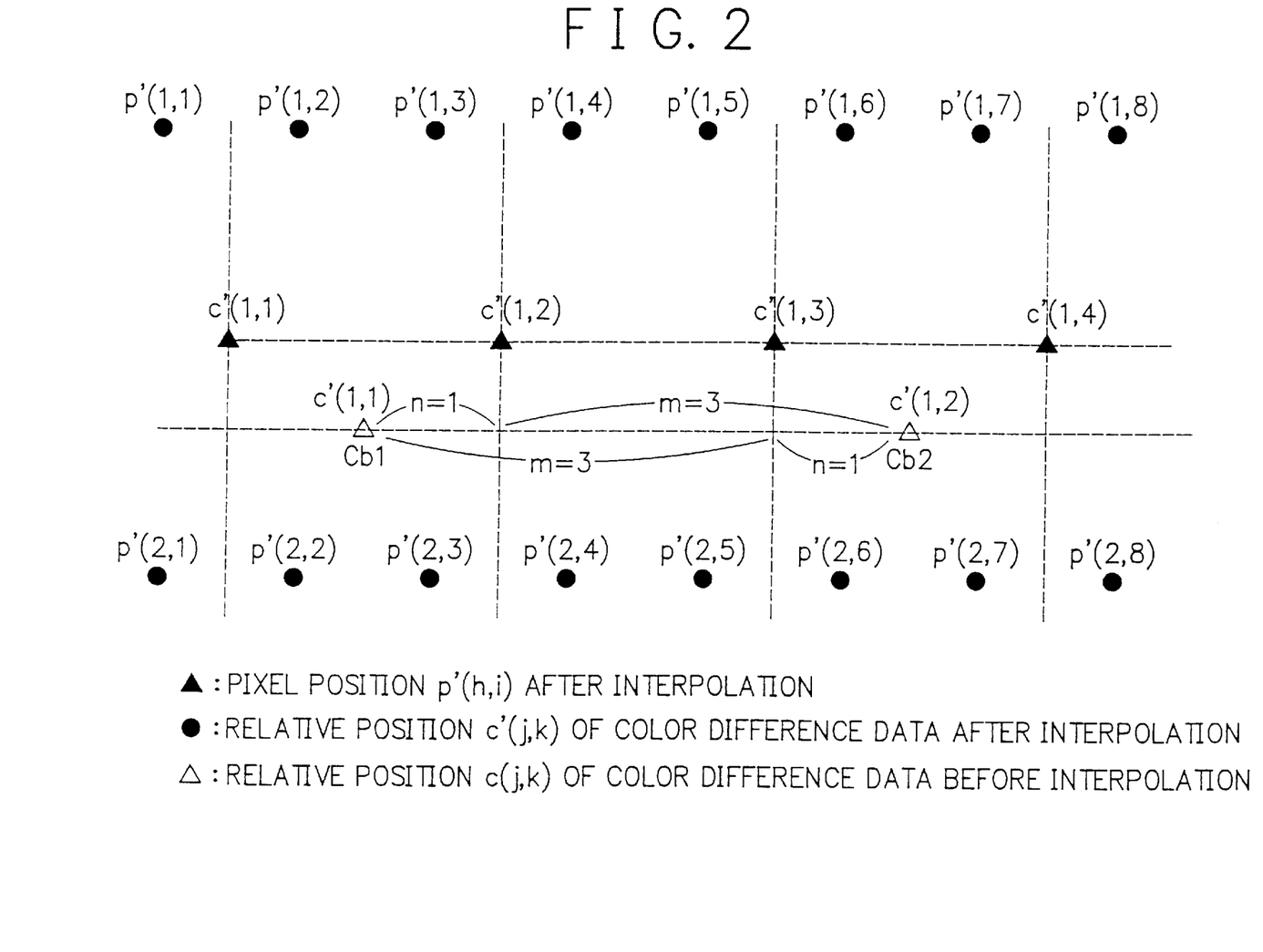
FIG. 2 is an explanatory diagram for explaining the relative positional relationships between pixel positions and color difference data items before and after interpolation.

FIG. 2 shows the relative positional relationship between pixels and color difference data items after the interpolation. As described above, when the horizontal picture size is doubled, the number of luminance data items is twice the original value and position p(1,1) before interpolation is changed to positions p'(1,1) and p'(1,2) after interpolation. Furthermore, the number of color difference data items is also doubled and position c(1,1) before interpolation is similarly altered to positions c'(1,1) and c'(1,2) after interpolation. In consequence, the relative positional relationship is unchanged between the pixel positions and color difference data items as a result of the enlargement of the horizontal picture size. Like in the state before the enlargement in picture size, one Cb data and one Cr data representing color difference correspond to four pixels, i.e., 2×2 pixels.

The interpolation is calculated according to the internal ratio obtained according to the distance between positions of two adjacent color difference data items before interpolation and the position of the color difference data after interpolation. For example, position c'(1,2) after interpolation is associated with an internally dividing point determined by internally dividing the distance N+M between two points c(1,1) and c(1,2) of two adjacent color difference data before interpolation according to internal ratio N:M=1:3. Resultantly, the degree of influence between these points, namely, the weighting value can be obtained to be oppositely proportional to the internal ratio. For example, assuming that positions c(1,1) and c(1,2) are respectively related to color difference data items Cb1 and Cb2, the color difference data at position c'(1,2) is calculated as (3×Cb1 +Cb2)/4. Moreover, in a similar manner, position c'(1,3) corresponds to an internally dividing point which divides the distance M+N between two points at positions c(1,1) and c(1,2) according to M:N=3:1, which leads to (3×Cb2+Cb1)/4. However, as the color difference data items for both ends such as positions c'(1,1) and c'(2,1), there are utilized the primary color difference data items attained using the nearest data positions associated therewith.

Figure 3:
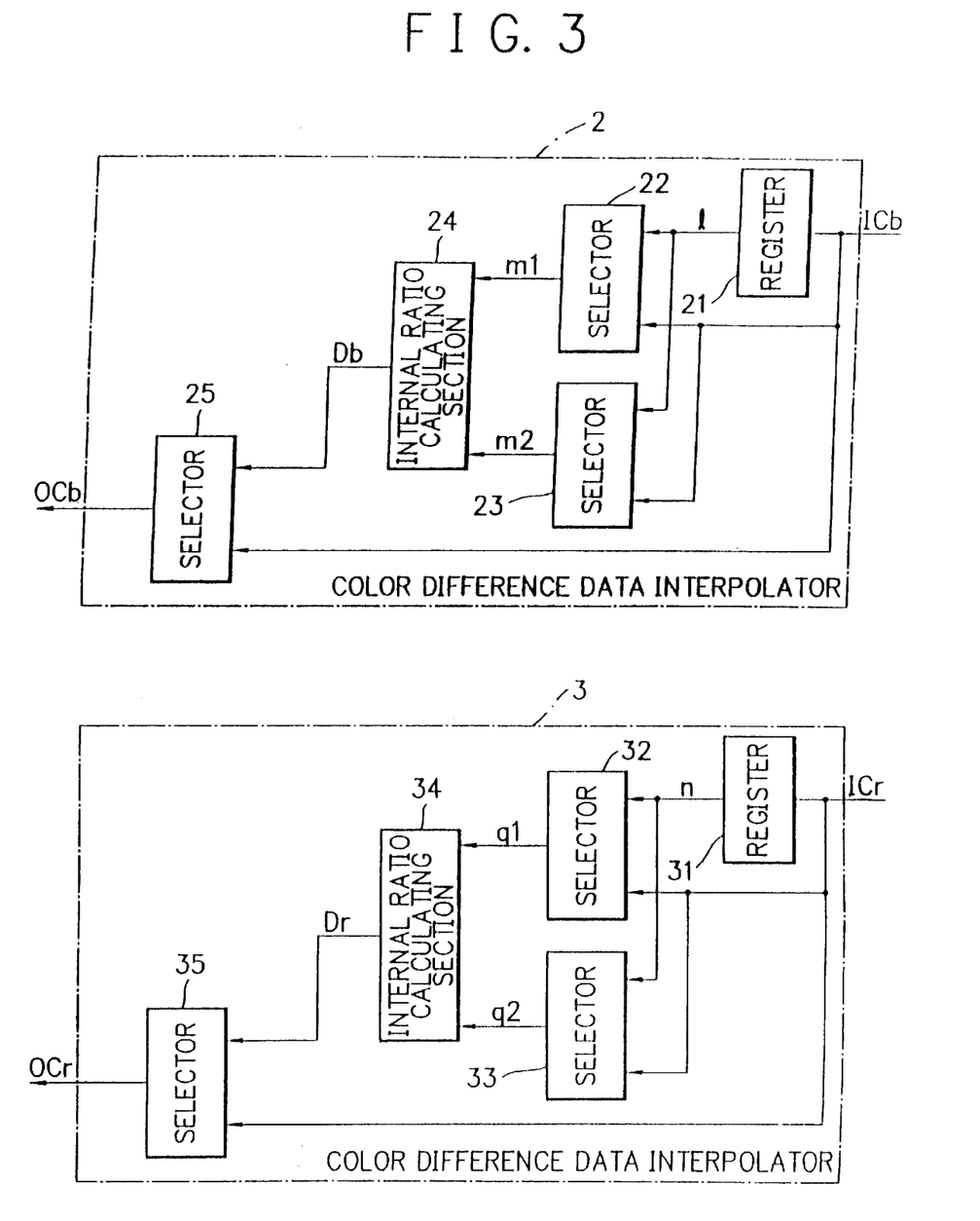
FIG. 3 is a block diagram schematically showing an example of the construction of a conventional image processing apparatus.

FIG. 3 shows in a block diagram a conventional image processing apparatus employing interpolation of color difference data. The apparatus includes a color difference data interpolating section 2 for interpolating color difference Cb and a color difference data interpolating section 3 for interpolating color difference Cr.

The interpolator 2 includes a register 21 for storing therein input color difference data ICb and outputting data 1 therefrom, selectors 22 and 23 each for selectively receiving data ICb or data 1 and for respectively outputting data m1 and data m2 therefrom, an internal ratio calculating section 24 for receiving data items m1 and m2, calculating an internal ratio therefrom, and outputting therefrom internal ratio data Db attained through a weighting operation using the internal ratio, and a selector 25 for selectively receiving data Db or ICb and outputting data OCb therefrom.

The interpolator 3 includes a register 31 for storing input color difference data ICr therein and outputting data n therefrom, selectors 32 and 33 each for selectively receiving data ICr or data n and for respectively outputting data items q1 and data q2 therefrom, an internal ratio calculating section 34 for receiving data items q1 and q2, calculating an internal ratio therefrom, and outputting therefrom internal ratio data Dr, and a selector 35 for selectively receiving data Dr or ICr and outputting data OCr therefrom.

Referring now to FIGS. 1 to 3, description will be given of operation of the conventional image processing apparatus. Input color difference data items ICb and ICr are inputted in a scanning order in a direction from the left-most pixel to the right-most pixel of each video line. For example, input color difference data ICb of the interpolator 2 is inputted in an order of data items Cb1, Cb2, Cb3, etc. respectively at positions (1,1), c(1,2), c(1,3), etc. Furthermore, input color difference data ICr of the interpolator 3 is inputted in an order of data items Cr1, Cr2, Cr3, etc. respectively at positions (1,1), c(1,2), c(1,3), etc. The color difference data interpolators 2 and 3 are of the same hardware configuration and similarly operate in a concurrent fashion. Therefore, the operation will be described primarily in association with the interpolator 2.

Since none of the end point video data can be adopted as the start point for the interpolation process, the selector 25 selects input color difference data ICb. For example, data Cb1 at position c(1,1) corresponding to pixel positions p(1,1) and p(1,2) is supplied from the data ICb such that the selector 25 chooses the data ICb and then delivers the data ICb without any modification as the color difference data OCb.

In the interpolation process of pixel data at other than the end point, the selector 25 selectively receives the data Db outputted from the internal ratio calculating section 24. To produce the data Db, the section 24 receives input color difference data items m1 and m2 respectively fed from the selectors 22 and 23, multiplies data m1 by three, adds the result of multiplication to data m2, and then divides the result of addition by four. In consequence, when the data items m1 and m2 are alternately exchanged with each other, there are generated interpolation data items respectively related to internal ratios 3:1 and 1:3.

First, color difference data Cb1 at position c(1,1) is stored in the register 21 to supply color difference data Cb2 at position c(1,2) from the input color difference data ICb to the selectors 22 and 23. The selector 22 then acquires data 1 from the register 21 to output the data 1 as data m1, whereas the selector 23 outputs as data m2 the data Cb2 supplied from the input color difference data ICb. On receiving data items m1 and m2, the internal ratio calculating section 24 calculates color difference interpolation data (3×Cb1+Cb2)/4 corresponding to C'(1,2) and then outputs the result as data Db. In the operation, the output data items m1 and m2 are exchanged with each other for the selectors 22 and 23.

The selector 23 outputs as data m2 the data 1 of the register 21, i.e., data Cb1. The selector 22 delivers therefrom as data m1 the data Cb2 supplied from the input color difference data ICb. Consequently, the internal ratio calculating section 24 calculates, in response to data items m1 and m2 thus supplied thereto, color difference interpolation data (3×Cb2+Cb1)/4 in association with c'(1,3) and then outputs the result as data Db.

Subsequently, color difference data Cb2 at position c(1,2) is stored in the register 21 to supply color difference data Cb3 at position c(1,3) from the input color difference data ICb. Additionally, the output data items are exchanged between the selectors 22 and 23 such that the selector 22 outputs as data m1 the data 1 of the register 22, i.e, data Cb2 and the selector 23 outputs as data m2 the data Cb3 attained from the input color difference data ICb. On receiving data items m1 and m2 from the registers 22 and 23, the internal ratio calculating section 24 produces color difference interpolation data (3×Cb2+Cb3)/4 in relation to position c'(1,4) and then outputs the result as data Db therefrom.

Thereafter, the output data items are similarly switched between the selectors 22 and 23 such that the selector outputs data Cb2 of the register 21 and the selector 22 delivers Cb3 from the input data ICb. In response thereto, the internal ratio section 24 calculates color difference interpolation data (3×Cb3+Cb2)/4 corresponding to position c(1,5) to resultantly output the result as data Db.

As above, by alternately exchanging data items m1 and m2 to be selectively received by the selectors 22 and 23, there can be sequentially created color difference data Cb in association with the internally dividing point.

As described in conjunction with the first pixel on the pertinent line, the interpolation is impossible for data Cb of the last pixel on the pertinent line. Therefore, the Cb input data ICb is directly outputted from the selector 25 in the output stage.

The image processing apparatus of the prior art includes interpolation data calculating circuits respectively for the color difference components Cb and Cr in an independent fashion, leading to a drawback of a large hardware configuration.

SUMMARY OF THE INVENTION

It is therefore an object of the present invention to provide an image processing circuit capable of enlarging the picture size of video data and conducting calculation for data interpolation with a reduced hardware size.

In accordance with the present invention, to achieve the object above, there is provided an image processing apparatus in which each set of pixels including a predetermined number of pixels has one luminance signal data item and in which in order to convert first video data in a first data format including one first color difference signal data and one second color difference signal data for each set of pixels into second video data in a second data format including one luminance data, one first color difference signal data, and one second color difference signal data for each pixel, an interpolation is conducted between positions of first and second color difference data items being adjacent to the first and second color signals of the first video data and being supplied in a sequential manner. The interpolation is conducted with first and second interpolation data items weighted to be oppositely proportional to an internal ratio associated with the color difference pixel data positions after interpolation. The apparatus includes time-sharing interpolation data calculating means for alternately calculating in a time-sharing process the first and second interpolation pixel data items respectively of the first and second color difference signals.

In the image processing apparatus, the time-sharing interpolation data calculating means includes first register for storing therein the first color difference pixel data item of the first color difference signal and outputting first storage data therefrom, second register for storing therein the first color difference pixel data item of the second color difference signal and outputting second storage data therefrom, a first selector responsive to a clock pulse for selecting either one of the first and second storage data items and the second color difference pixel data items respectively of the first and second color difference signals and outputting a first selection data item therefrom, a second selector responsive to a clock pulse for selecting either one of the first and second storage data items and the second color difference pixel data items respectively of the first and second color difference signals and outputting a second selection data item therefrom, an internal ratio calculating circuit responsive to the clock pulse for receiving the first and second selection data items, multiplying in association with the internal ratio M:N (M and N are integers) the first selection data item by M, multiplying the second selection data items by N, adding results respectively of the multiplications to each other, dividing a result of the addition by M+N, and outputting internal ratio calculation data corresponding to the first and second interpolation data items, a third register responsive to the clock pulse for temporarily storing therein the first and second interpolation data items of the first color difference signal selected from the internal ratio calculation data and outputting the data items at timing synchronized with the clock pulse, and a fourth register responsive to the clock pulse for temporarily storing therein the first and second interpolation data items of the second color difference signal selected from the internal ratio calculation data and outputting the data items at timing synchronized with the clock pulse.

Furthermore, the image processing apparatus includes a fifth register for temporarily keeping therein the first and second interpolation data items of the first color difference signal and outputting the first and second interpolation data items at timing synchronized with timing of the first and second interpolation data items of the second color difference signal.

Moreover, in the image processing apparatus, the internal ratio M:N is 3:1.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 4:
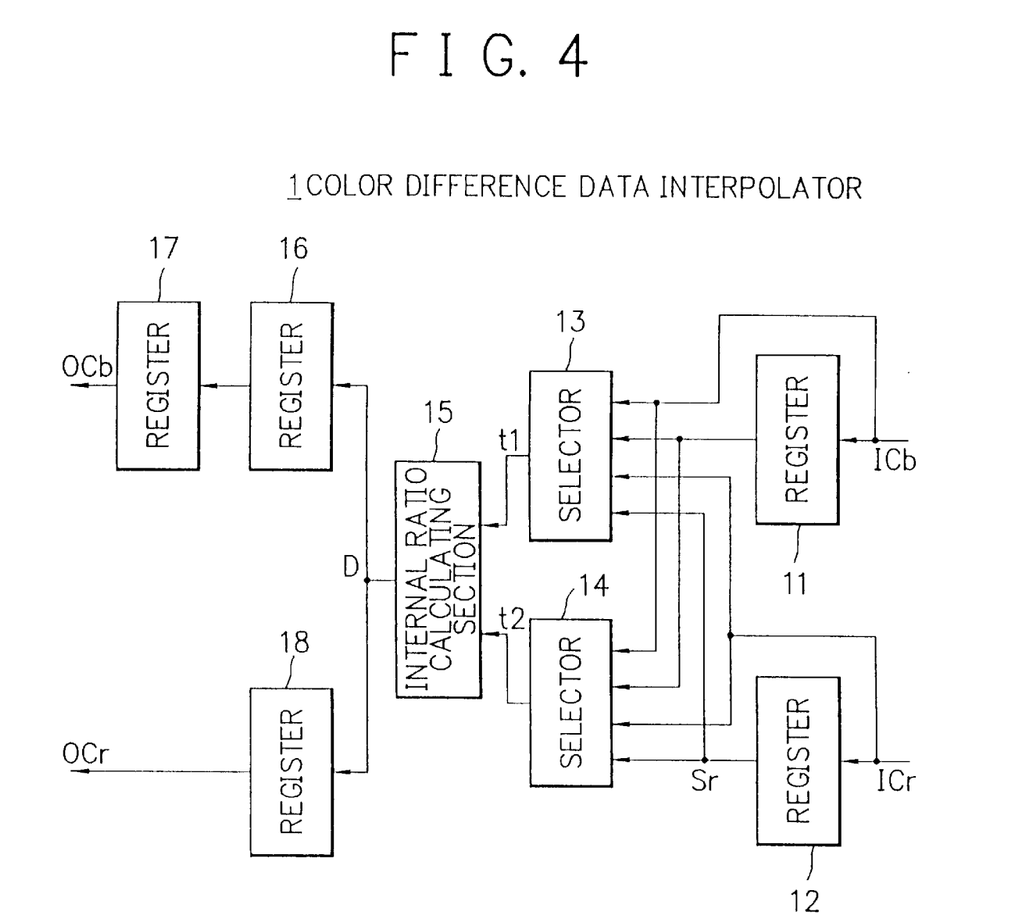
FIG. 4 is a schematic block diagram showing the configuration of an embodiment of the image processing apparatus in accordance with the present invention.

Referring now to FIG. 4 showing in a block diagram an embodiment of the image processing apparatus in accordance with the present invention, the apparatus includes a color difference data interpolating section 1. The interpolator 1 includes a register 11 for storing therein and outputting therefrom data sb adjacent to or immediately preceding input color difference data ICb, a register 12 for storing therein and outputting therefrom data sr adjacent to or immediately preceding input color difference data ICr, selectors 13 and 14 for selectively receiving data items ICb, Sb, ICr, and sr in response to clock pulse CLK supplied thereto and respectively outputting therefrom data items t1 and t2, an internal ratio calculating section 15 responsive to the clock signal CLK for receiving data items t1 and t2, calculating a weighting value to be oppositely proportional to the internal ratio associated with the relative positional relationship between the color difference data items before and after interpolation, and resultantly outputting internal ratio data D therefrom, a register 16 responsive to the clock pulse CLK for storing therein and outputting therefrom color difference Cb data B obtained according to the internal ratio data D, a register 17 responsive to the clock pulse CLK for delaying the data B for a period time corresponding to one clock CLK and outputting therefrom color difference data OCb synchronized in timing with the data OCr, and a register 18 responsive to the clock CLK for outputting therefrom color difference data OCr related to the color difference component Cr attained according to the data D.

Figure 5:
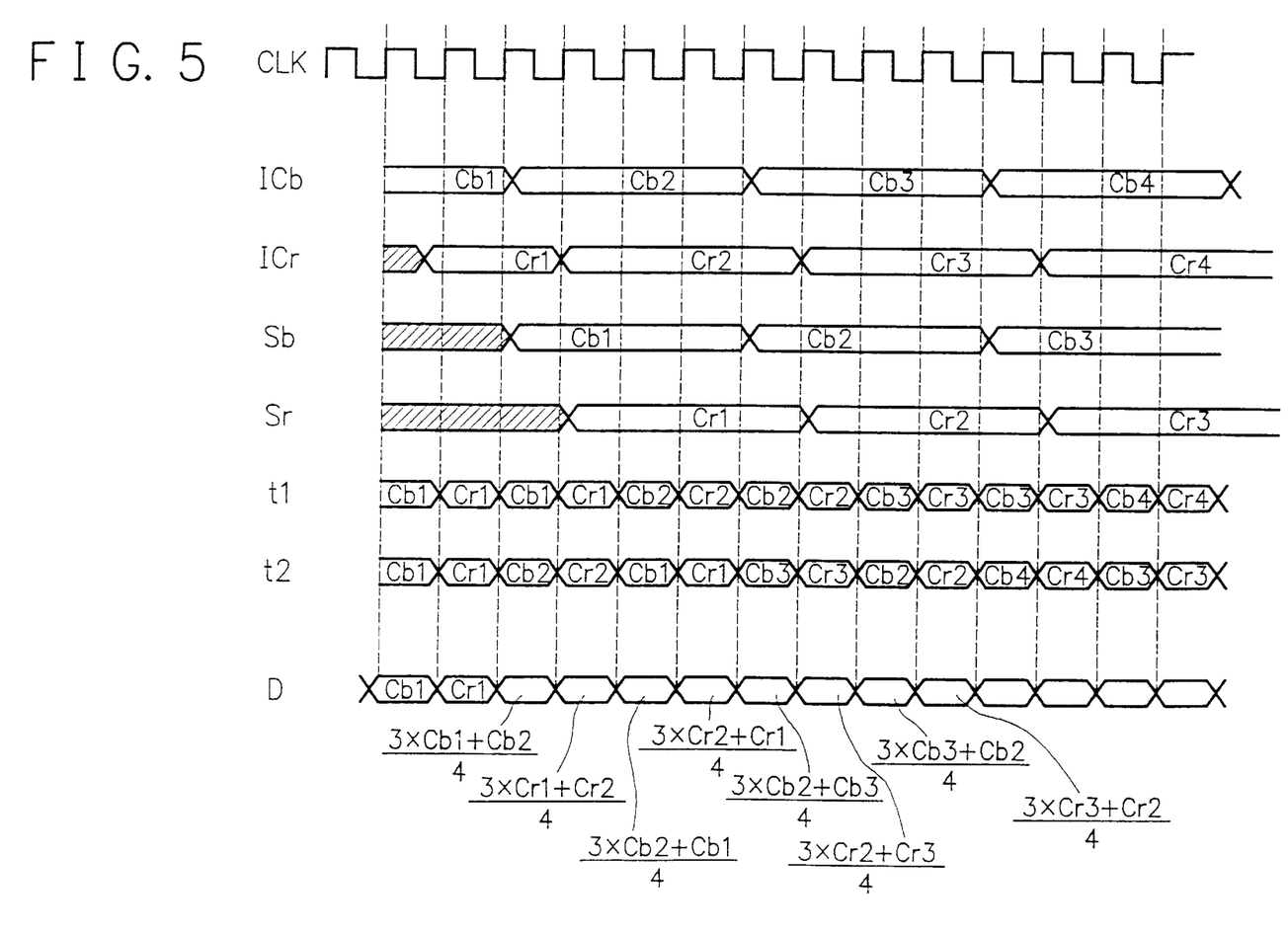
FIG. 5 is a signal timing chart showing an example of operation of the image processing apparatus of FIG. 4.

Referring next to the system configuration of FIG. 4 and the operational timing chart of the embodiment shown in FIG. 5, description will be given of operation of the image processing apparatus. In response to a clock pulse CLK produced as a pixel display clock signal, input color difference data items ICb and ICr are inputted to the apparatus in a scanning order of pixels from the left-most pixel to the right-most pixel on the pertinent line. As a result of selective data receiving operations of the selectors 13 and 14, there are conducted two kinds of control operations for the creation of interpolation data respectively when the color difference data is at an end of the line and when the data is at other than the end thereof. For simplification of explanation, the internal ratio is assumed to be N:M=1:3 in this example.

Output data items t1 and t2 respectively from the selectors 13 and 14 are fed as the M and N inputs to the internal ratio calculating section 15 according to the internal ratio M:N= 3:1. Therefore, when calculating the interpolation data for the ratio 3:1, the selective operation of the selectors 13 and 14 are accomplished such that the input color difference data ICb is set as data t1 and the data sb from the register 11 is set as data t2. When the internal ratio is 1:3, the selecting operation of the selectors 13 and 14 are carried out to set the data sb from the register 11 as data t1 and the input color difference data ICb as data t2.

In a case in which the interpolation data is created for the end points of the pertinent line, the selectors 13 and 14 choose the input color difference data ICb for the output data items t1 an t2 when processing the color difference data Cb. In the processing of the color difference data Cr, the selectors 13 and 14 select the input color difference data ICr for the output data items t1 an t2. In other words, when generating the interpolation data for the color difference data Cb at position c'(1,1), the data Cb1 is outputted as data items t1 and t2 respectively from the selectors 13 and 14. The internal ratio calculator 15 multiplies the data t1=Cb1 by three and then adds the result of multiplication to the data t2=Cb1. Thereafter, the value resultant from the addition is divided by four. Namely, there is achieved the calculation of (3×t1+t2)/4. As a result, the output data Cb1 is substantially identical to the input data. In a similar manner, the interpolation data is obtained for the color difference data Cr at position c'(1,1). Data Cr1 is delivered as data items t1 and t2 respectively from the selectors 13 and 14 such that the calculator 15 conducts the operation of (3×t1+t2)/4 to resultantly output data Cr1 substantially equal to the input data.

When the interpolating operation above is impossible or when the interpolation data is not desired to be outputted therefrom, it is only necessary to equalize t1 and t2 to each other before t1 and t2 are fed to the internal ratio calculating section 15.

Furthermore, when generating the interpolation data at other than the end position of the pertinent line, the selectors 13 and 14 alternately exchange the input color difference data ICb and the previous data sb stored in the register 11 to generate data items t1 and t2. On receiving the data items t1 and t2, the calculator 15 carries out the internal ratio calculation with the internal ratio 1:3 or 3:1 so as to resultantly create the interpolation data.

Returning now to FIG. 5, description will be given of the exchange timing of the input color difference data items ICb and ICr and selector output data items t1 and t2. First, data Cb1 is inputted as color difference data ICb. Since the interpolation cannot be achieved for data Cb1 synchronized with the first clock pulse CLK, the internal ratio calculating section 15 conducts an operation of (3×Cb1+Cb1)/4 to output as data D the result of calculation.

At timing synchronized with the second clock CLK, data Cr1 is inputted as color difference data ICr. In this operation, the input data Cb1 is stored as data sb in the register 11. As described above for the data Cb1, the interpolating operation is impossible for the first data Cr1, the calculator 15 carries out an operation of (3×Cr1+Cr1)/4 to output as data D the result of calculation.

In synchronism with the third clock CLK, data Cb2 is supplied from the color difference data ICb. While the selector 13 chooses as data t1 the data sb=Cb1 from the register 11, the selector 14 selects as data t2 the color difference data ICb=Cb2. Therefore, the calculator 15 conducts an operation of (3×Cb1+Cb2) to output as data D the Cb interpolation data at position c'(1,2). At output timing of the data D associated with the Cb interpolation data, data Cr1 is attained from the color difference data ICr and is stored as data sr in the register 12.

At timing of the fourth clock pulse CLK, data Cr2 is fed from the color difference data ICr. The selector 13 chooses as data t1 the output data sb=Cr1 from the register 12, whereas the selector 14 selects as data t2 the color difference data ICr=Cr2. Consequently, the calculator 15 executes an operation of (3×Cr1+Cr2)/4 to obtain the Cr interpolation data at position c'(1,2) and then outputs the result as data D therefrom.

When the fifth clock CLK is received, the selector 13 selects the color difference data ICb=Cb and the selector 14 chooses the output data sb=Cb1 from the register 11. Therefore, the calculating section 15 accomplishes an operation of (3×Cb2+Cb1)/4 to attain the Cb interpolation data at c'(1,3) and then outputs the result as data D.

In synchronism with the six clock pulse CLK, the selector 13 selectively receives the color difference data ICr=Cr2 and the selector 14 chooses the output data sr=Cr1 from the register 11. In consequence, the calculator 15 accomplishes an operation of (3×Cr2+Cr1)/4 to produce the Cr interpolation data at c'(1,3) and then outputs the obtained value as data D. At the output timing of data D associated with the Cr interpolation data, data Cb2 supplied from the color difference data ICb is stored as data sb in the register 11.

At reception of the seventh clock CLK, data Cb3 is supplied from the color difference data ICb. The selector 13 chooses data sb=Cb2, whereas the selector 14 selects the color difference data ICb=Cb3. Therefore, the calculating unit 15 executes an operation of (3×Cb2+Cb3)/4 to outputs the Cb interpolation data at position c'(1,4) and then outputs the result as data D. At output timing of data D corresponding to the Cb interpolation data, data Cr2 attained from the color difference data ICr is stored as data sr in the register 12.

As described above, the internal ratio calculating section 15 alternately produces the interpolation data items related to the data items Cb and Cr and outputs the result as data D therefrom.

The register 16 stores therein the interpolation data attained from the output data D from the calculating section 15 and only associated with data Cb and the register 18 similarly memorizes therein the interpolation data attained from the output data D and only associated with data Cr. Since the output timing varies between the output data items QCb and OCr respectively from the registers 16 and 18, there is utilized a register 17 to delay the data QCb for a period of time equivalent to one clock CLK for the production of the output data OCb.

Description has been given of an embodiment of the image processing apparatus in accordance with the present invention. In addition thereto, when there is introduced a mode in which data interpolation is unnecessary, namely, when the video data is simply outputted in a duplicated fashion, it is only necessary to additionally provide a control operation such that the selectors alternately select the input color difference data items respectively associated with Cb and Cr.

In accordance with the present invention as described above, when a video picture in the 4:2:2 YCbCr format, namely, the compressed YCbCr format is to be doubled, the interpolation processes of color difference components Cb and Cr are accomplished by one hardware system through a time-sharing operation. This leads to minimization of the hardware configuration of the apparatus.

As above, the image processing apparatus in accordance with the present invention includes means for calculating time-sharing interpolation data in which the interpolation pixel data items respectively associated with two types of color discrepancy signals are alternately calculated in a time-sharing process. Thanks to the provision, the number of hardware components is reduced due to the time-sharing operation of the interpolation of two kinds of color difference data items Cb and Cr. Moreover, since the same processing route can be used in the mode using the interpolation and in the mode not using the interpolation, the selection circuit can be dispensed with in the subsequent stage of the apparatus. As a result, the hardware size can be advantageously minimized to half that of the prior art.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An image processing apparatus comprising:
   a) means for dividing first video data into a plurality of pixel sets wherein each pixel set is comprised of a plurality of pixels in a first data format and each pixel in said pixel set has an associated luminance signal data item and each pixel set further contains at least one first color difference signal and at least one second color difference signal;
   b) time-sharing interpolation data means, coupled to said dividing means, for converting first video data in a first format into second video data in a second format wherein said second format provides additional chrominance information to retain data continuity; and
   c) switching means, coupled to said time-sharing interpolation data means, for outputting the interpolated first and second color difference signals;
   wherein the time-sharing interpolation data calculating means includes:
      first register for storing therein the first color difference pixel data item of the first color difference signal and outputting first storage data therefrom;

second register for storing therein the first color difference pixel data item of the second color difference signal and outputting second storage data therefrom;

a first selector responsive to a clock pulse for selecting either one of the first and second storage data items and the second color difference pixel data items respectively of the first and second color difference signals and outputting a first selection data item therefrom;

a second selector responsive to a clock pulse for selecting either one of the first and second storage data items and the second color difference pixel data items respectively of the first and second color difference signals and outputting a second selection data item therefrom;

an internal ration calculating circuit responsive to the clock pulse for receiving the first and second selection data items, multiplying in association with the internal ratio M:N (M and N are integers) the first selection data item by M, multiplying the second selection data items by N, adding results respectively of the multiplications to each other, dividing a result of the addition by M+N, and outputting internal ratio calculation data corresponding to the first and second interpolation data items;

a third register responsive to the clock pulse for temporarily storing therein the first and second interpolation data items of the first color difference signal selected from the internal ratio calculation data and outputting the data items at timing synchronized with the clock pulse; and a fourth register responsive to the clock pulse for temporarily storing therein the first and second interpolation data items of the second color difference signal selected from the internal ratio calculation data and outputting the data items at timing synchronized with the clock pulse.

2. An image processing apparatus in accordance with claim 1, further including a fifth register for temporarily keeping therein the first and second interpolation data items of the first color difference signal and outputting the first and second interpolation data items at timing synchronized with timing of the first and second interpolation data items of the second color difference signal.

3. An image processing apparatus in accordance with claim 1, wherein the internal ratio M:N is 3:1.

4. An image processing apparatus comprising:
a) means for dividing first video data into a plurality of pixel sets wherein each pixel set is comprised of a plurality of pixels in a first data format and each pixel in said pixel set has an associated luminance signal data item and each pixel set further contains at least one first color difference signal and at least one second color difference signal;
b) time-sharing interpolation data means, coupled to said dividing means, for converting first video data in a first format into second video data in a second format wherein said second format provides additional chrominance information to retain data continuity; and
c) switching means, coupled to said time-sharing interpolation data means, for outputting the interpolated first and second color difference signals;
wherein the time-sharing interpolation means includes means for alternately calculating in a time-sharing process the first and second interpolation pixel data items respectively of the first and second color difference signals; and
wherein the time-sharing interpolation is conducted with first and second interpolation data items weighted to be oppositely proportional to an internal ratio associated with the color difference pixel data positions after interpolation.

* * * * *